(12) United States Patent
Hibiki

(10) Patent No.: US 8,061,267 B2
(45) Date of Patent: Nov. 22, 2011

(54) APPARATUS FOR ROASTING SKEWERED FOOD

(75) Inventor: Yoshiharu Hibiki, Kawagoe (JP)

(73) Assignee: Hibiki Corporation, Saitama (JP)

( * ) Notice: Subject to any disclaimer, the term of this patent is extended or adjusted under 35 U.S.C. 154(b) by 814 days.

(21) Appl. No.: 12/164,348

(22) Filed: Jun. 30, 2008

(65) Prior Publication Data

US 2009/0000492 A1    Jan. 1, 2009

(30) Foreign Application Priority Data

Jun. 28, 2007 (JP) ................................. 2007-169834

(51) Int. Cl.
*A47J 37/04* (2006.01)
(52) U.S. Cl. ........................................................ 99/420
(58) Field of Classification Search .................... 99/420, 99/421 HV, 421 V
See application file for complete search history.

(56) References Cited

U.S. PATENT DOCUMENTS 4,635,539 A * 1/1987 Tanaka ...................... 99/421 H
5,271,316 A * 12/1993 Wisting ......................... 99/420

* cited by examiner

*Primary Examiner* — Raeann Gorden
(74) *Attorney, Agent, or Firm* — Sughrue Mion, PLLC

(57) ABSTRACT

The present invention provides an apparatus for roasting skewered food in which a raw material of skewered food can easily be set on a skewer holder, so that a skewered roasted food can be cooked easily and quickly, and the skewer holder can easily be dismounted within a short period of time. The apparatus for roasting skewered food 1 comprises a skewer holder carrying mechanism 2 which carries a raw material of skewered food C prepared by setting food materials B on a skewer A with skewer holders 20 mounted on an endless rotary chain 7 in the vertical posture, heating devices 3, 4 for heating the raw material C from the both sides while the raw material C are being carried, a sauce storage tank 5 for immersing the raw material C in sauce, and a control unit 6 for actuating and stopping the skewer holder carrying mechanism 2 and also for controlling a carrying speed.

9 Claims, 14 Drawing Sheets

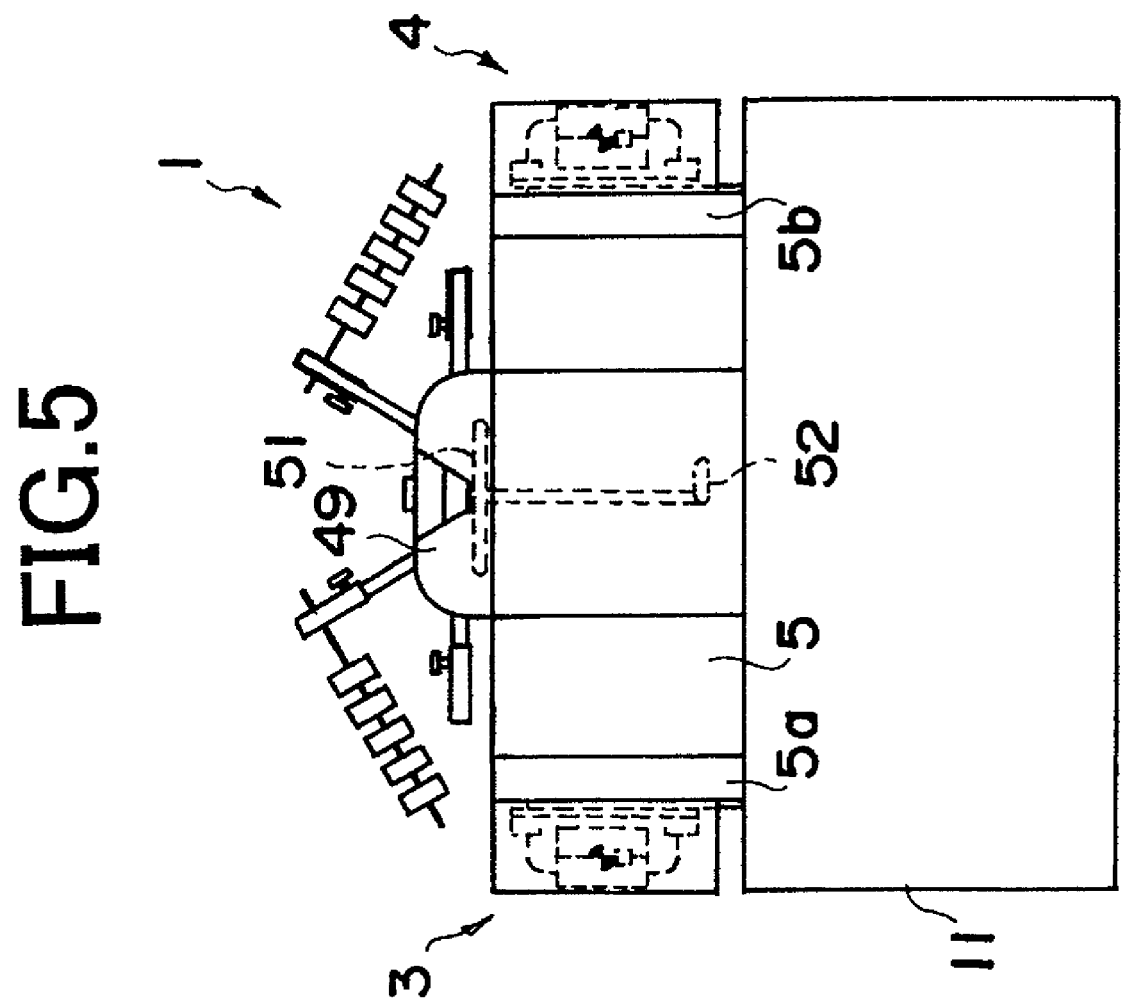

APPARATUS FOR ROASTING SKEWERED FOOD

BACKGROUND OF THE INVENTION

1. Field of the Invention

The present invention relates to an apparatus for roasting skewered food which can quickly cook a large amount of skewered roasted food such as skewered roasted chickens, skewered roasted giblets and the like prepared by heating pieces of meat, fish, vegetables and the like set on a skewer.

2. Description of Related Art

There has been known the method of cooking skewered roasted food by setting pieces of meat, fish, vegetables and the like on a skewer and heating the materials, but for cooking skewered roasted food such as skewered roasted chickens, skewered roasted giblets and the like which can be provided and sold at pubs, restaurants, or other types of stores, persons hoping to engage in the job are required to work as apprentices at skilled persons for several years. In addition, because scales of the pubs, restaurants, and other stores have been increasingly larger, it is required to cook a large amount of skewered roasted food quickly within a short period of time.

To satisfy the need as described above, there has been proposed the apparatus for roasting skewered food which can quickly cook a large amount of skewered roasted food within a short period of time without requiring the long time job training, in which a number of skewer holders are mounted on an endless rotary chain with a prescribed space in-between, raw materials of skewered food prepared by setting food materials on a skewer are held on the skewer holders in order, and the raw materials of skewered food are carried along heating devices for heating the raw materials of skewered food to prepare skewered roasted food (Refer to, for instance, Japanese Patent Laid.-Open Publication No. 2004-57463).

In the conventional type of apparatus for roasting skewered food as described above, when a raw material of skewered food is held on skewer holder, it is required to hold the raw material of skewered food in the substantially horizontal posture. However, it is difficult for an operator to hold the raw material of skewered food in the horizontal posture, and because it is required to hold the raw material of skewered food with the tip portion of the skewer facing against the operator, the food materials are touched by the operator's fingers, which is not desirable from the sanitary point of view.

Furthermore, there is no step of immersing a raw material of skewered food in sauce during the process of carrying the raw material of skewered food along heating devices with an endless rotary chain for heating, and therefore, after the raw material of skewered food is heated to roast, it is necessary to immerse the raw material of skewered food in sauce and heat the raw material of skewered food again, so that the work load is rather heavy and the period of time required for cooking skewered roasted food is disadvantageously long.

In addition, because linking pins or the like are used for mounting the skewer holders on the endless rotary chain, when the number of skewer holders is to be changed or any skewer holder is exchanged with a new one because of a failure or for some other reasons, it is required to remove the endless rotary chain from sprockets and then dismount skewer holders, and therefore, the work for dismounting skewer holders is laborious and requires a long period of time.

SUMMARY OF THE INVENTION

The present invention was made to solve the problems in the conventional technology, and an object of the present invention is to provide an apparatus for roasting skewered food, in which an operator can easily hold a raw material of skewered food when the raw material of skewered food is set on a skewer holder, and the food materials are not touched by operator's fingers, so that it is desirable from the sanitary point of view, and it is easy to cook skewered roasted food within a short period of time because there is provided a step of immersing the raw material of skewered food in sauce during a process of heating the raw material of skewered food, and also it is easy to dismount the skewer holders within a short period of time.

In order to achieve the object, the apparatus for roasting skewered food according to the present invention comprises a skewer holder carrying mechanism that carries a raw material of skewered food prepared by setting food materials on a skewer in the vertical posture with a skewer holder mounted on an endless rotary chain; heating devices which heat the raw material of skewered food from the both sides while the raw material of skewered food are being carried; a sauce storage tank in which the raw material of skewered food is immersed in sauce; and a control unit which actuates, stops, and controls a carrying speed of the skewer holder carrying mechanism.

The apparatus for roasting skewered food according to the present invention further comprises a skewer releasing mechanism which is pressed to a release pin fixed on a movable clamping body of a skewer holder to rotate the movable clamping body against an elastic force of a spring and release a skewer from clamping by a holder main body of the skewer holder and the movable clamping body, and said skewer releasing mechanism is provided at an edge portion of the skewer holder carrying mechanism.

The holder main body preferably has a supporting pin guide groove formed thereon, and the skewer holder can be set on the endless rotary chain via a supporting member by inserting the supporting pin into the supporting pin guide groove.

Because of the configuration of the apparatus for roasting skewered food as described above, an operator can easily hold the raw material of skewered food with fingers and the food materials are not touched with operator's fingers, which is desirable from the sanitary point of view, and it is easy to cook skewered roasted food within a short period of time because there is provided a step of immersing the raw material of skewered food in sauce during a process of carrying the raw material of skewered food for heating, and it is easy to dismount skewer holders within a short period of time.

It is preferable to provide a skewer holder lifting member for guiding the skewer holder placed thereon with a height of an upper edge face changeable at a position adjacent to the sauce storage tank, in which the raw material of skewered food is immersed in sauce.

Furthermore, there is provided a sauce adhesion preventing mechanism comprising a skewer holder holding member for guiding the skewer holder placed thereon, a holding member support lever having a curved form, a grasping member, a grasping member support lever having a straight form, and a linking member for linkage between the holding member support lever and the grasping member support lever. With the sauce adhesion preventing mechanism, when the grasping member support lever is moved, the skewer holder holding member moves upward and is positioned at the substantially same level as that of an upper edge face of the skewer holder lifting member, and therefore, the raw material of skewered food is prevented from being immersed in sauce.

BRIEF DESCRIPTION OF THE DRAWINGS

FIG. 5 is a rear face view of the apparatus for roasting skewered food according to the present invention.

DETAILED DESCRIPTION OF THE INVENTION

A preferable embodiment of the apparatus for roasting skewered food according to the present invention is described specifically in detail with reference to the drawings.

Figure 1:
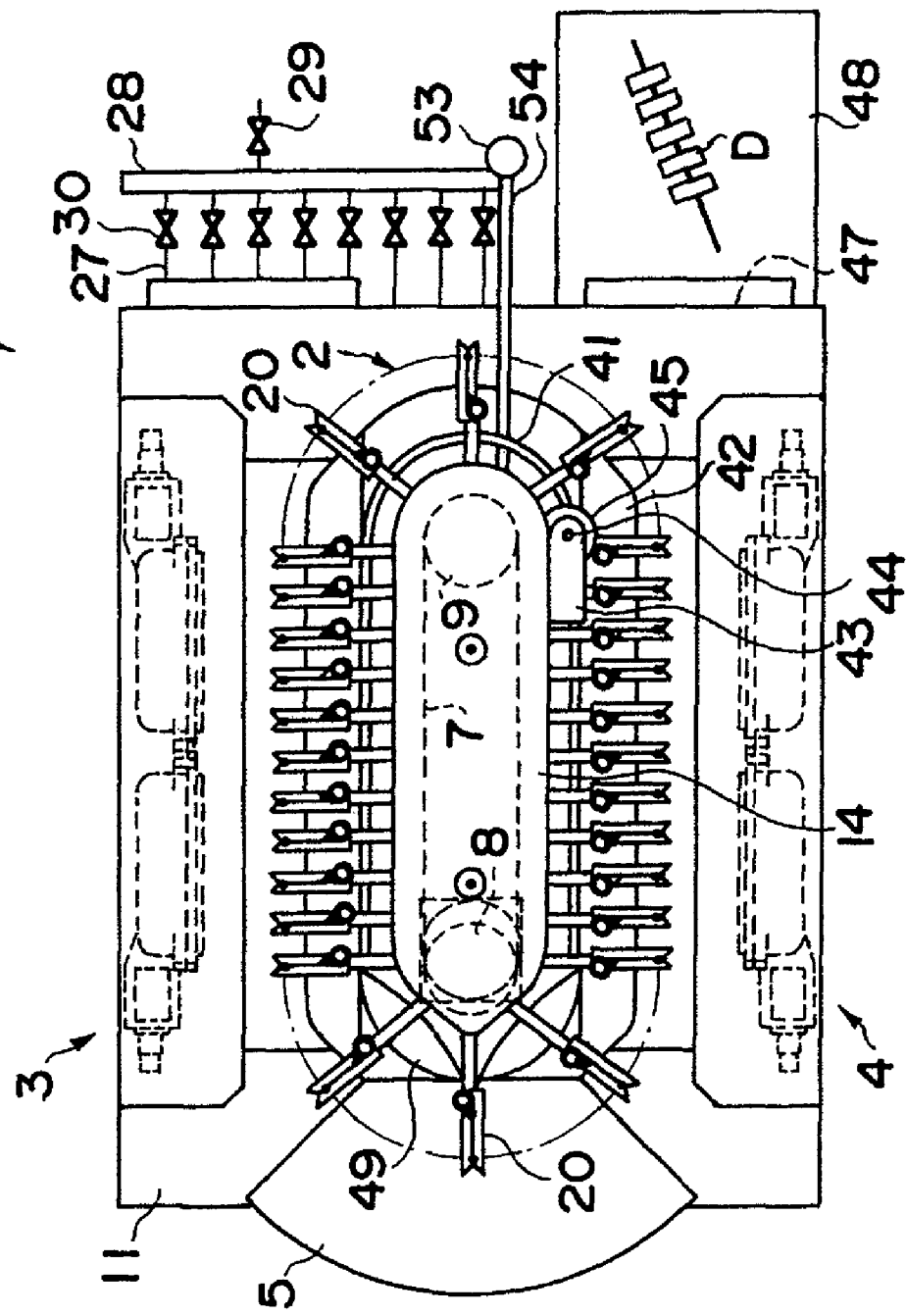
FIG. 1 is a plan view of an apparatus for roasting skewered food according to the present invention.
Figure 2:
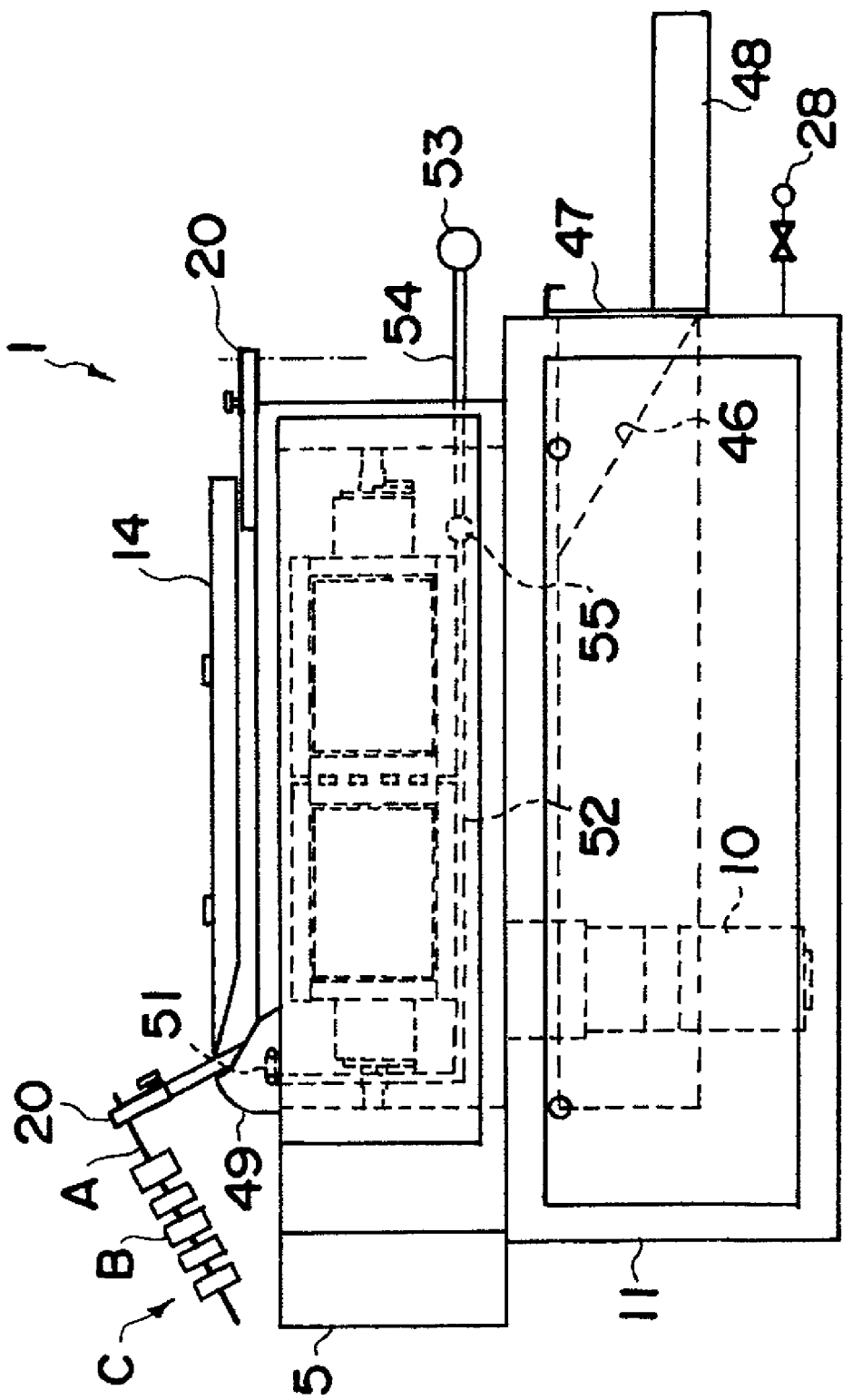
FIG. 2 is a left side view of the apparatus for roasting skewered food according to the present invention.
Figure 3:
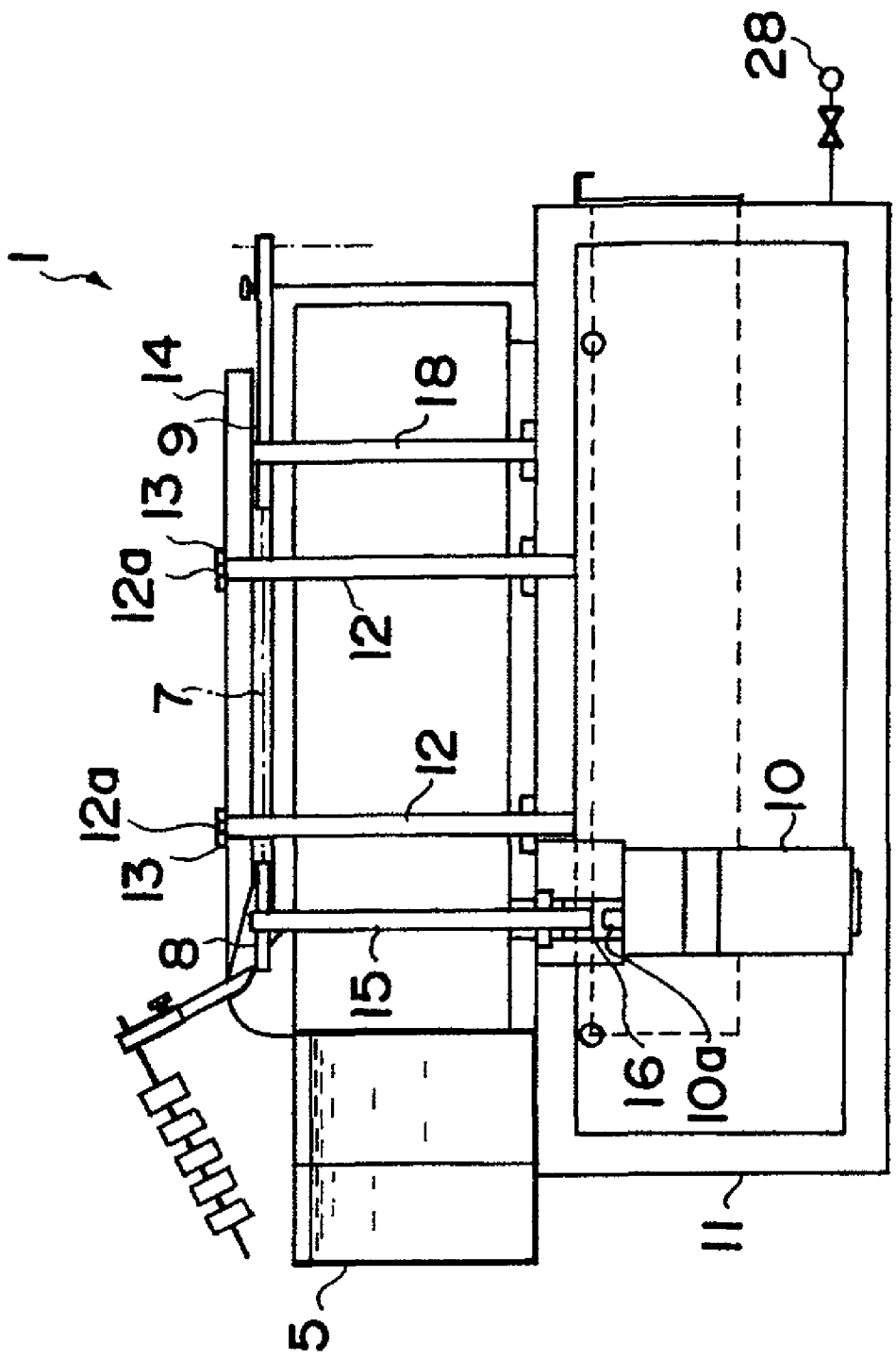
FIG. 3 is a longitudinal cross-sectional view of the apparatus for roasting skewered food according to the present invention.
Figure 4:
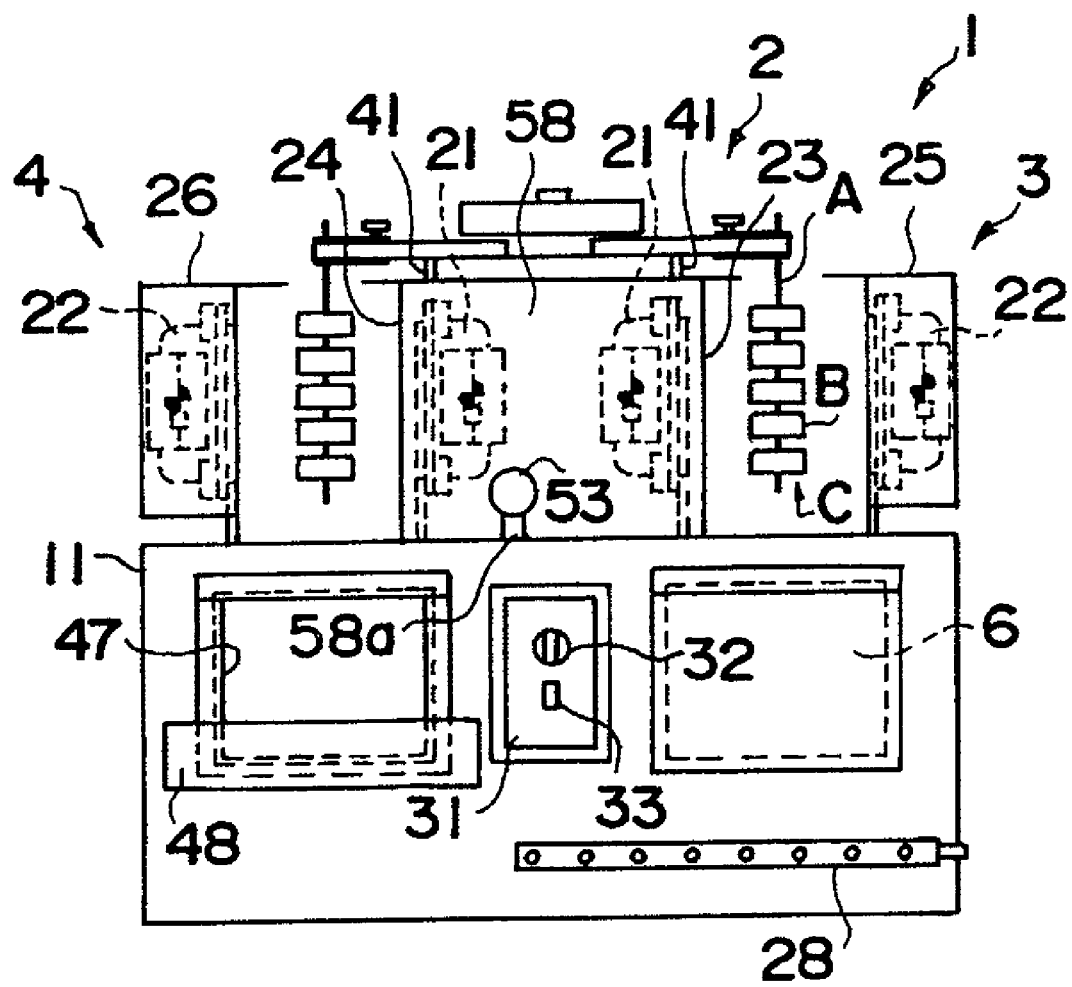
FIG. 4 is a front view of the apparatus for roasting skewered food according to the present invention.

FIG. 1 is a plan view of the apparatus for roasting skewered food according to the present invention, FIG. 2 is a left side view of the apparatus, FIG. 3 is a longitudinal cross-sectional view of the apparatus, FIG. 4 is a front view of the apparatus, and FIG. 5 is a rear view of the apparatus.

An apparatus for roasting skewered food 1 according to the present invention comprises a skewer holder carrying mechanism 2, heating devices 3, 4, a sauce storage tank 5, and a control unit 6 as shown in FIG. 1 to FIG. 5.

The skewer holder carrying mechanism 2 comprises an endless rotary chain 7, a driving sprocket 8, a driven sprocket 9, and a driving motor 10.

Provided on a top face portion 11a of a base 11 are column supports 12, 12 with a prescribed space in-between in the longitudinal direction of the base 11 in the upright state, and a ceiling plate 14 is provided on upper edge faces of column supports 12, 12 and is fixed to the faces by screwing a nut 13 into a thread portion 12a formed on each of the top edge portion of the column supports 12, 12.

Figure 6A:
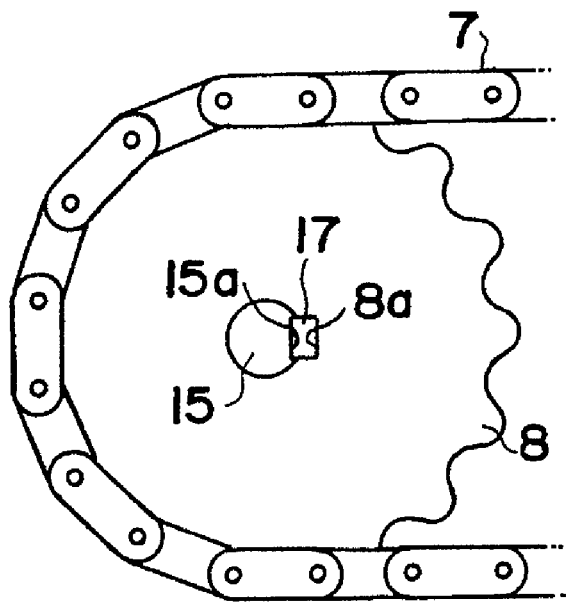
FIG. 6A is a plan view illustrating a driving sprocket mounting section and FIG. 6B is a cross-sectional view illustrating the driving sprocket mounting section.
Figure 6B:
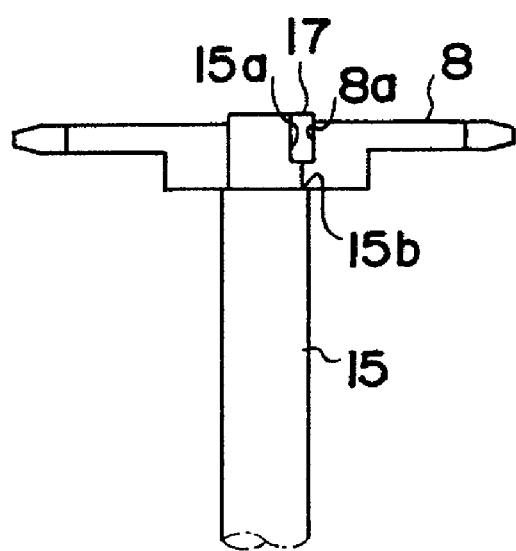

A driving shaft 15 is provided in the upright state at the back of the base 11, and as shown in FIG. 3 and FIG. 6, the driving sprocket 8 is fixed to an upper edge portion of the driving shaft 15. A shaft 10a of the driving motor 10 is linked via a linking member 16 to a lower edge portion of the driving shaft 15.

As shown in FIG. 6, a key groove 15a is provided in the driving shaft 15, while a key groove 8a is provided in the driving sprocket 8, and the driving sprocket 8 can easily be set in or dismounted from the driving shaft 15 by manually engaging a key 17 in or removing the key 17 from each of the key grooves 15a and 8a.

A stepped portion 15b is provided in the driving shaft 15 for preventing the driving sprocket 8 from moving downward.

Figure 7A:
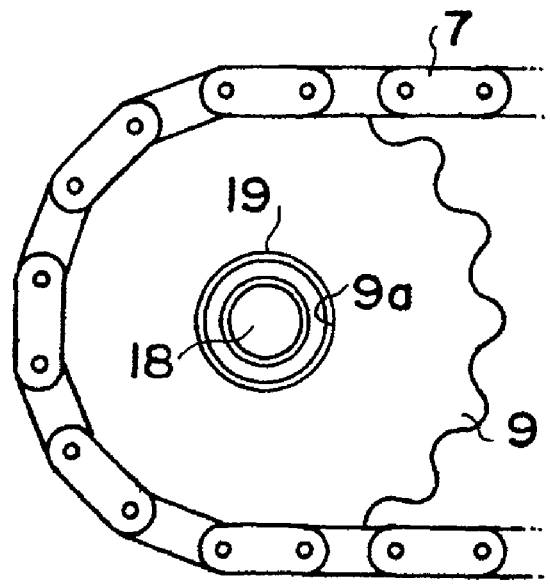
FIG. 7A is a plan view illustrating a driven sprocket mounting section and FIG. 7B is a cross-sectional view illustrating the driven sprocket mounting section.
Figure 7B:
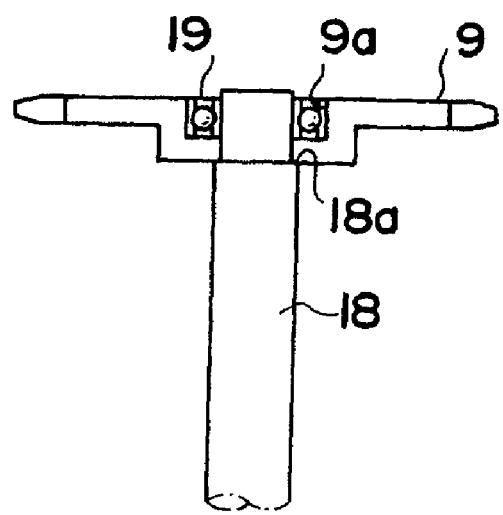

A driven shaft 18 is provided in the upright state in front of the base 11, and as shown in FIG. 3 and FIG. 7, the driven sprocket 9 is fixed via a bearing 19 on a top edge portion of the driven shaft 18.

As shown in FIG. 7, the bearing 19 is press-fit into an engagement hole 9a of the driven sprocket 9, while the bearing 19 is loosely engaged with the driven shaft 18. Therefore, when the driven sprocket 9 is pulled upward strongly, the driven sprocket 9 can relatively easily be disengaged from the driven shaft 18.

To prevent the driven sprocket 9 from moving downward, a stepped portion 18a is formed on the driven shaft 18.

Furthermore, the endless rotary chain 7 is spanned over the driving sprocket 9 and the driven sprocket 9, and a plurality of skewer holders 20, 20 are mounted with a prescribed space on the endless rotary chain 7.

The driving sprocket 8 and the driven sprocket 9 may be provided either in front of or at the back of the base 11.

The heating devices 3, 4 are provided at both sides of the skewer holder carrying mechanism 2, and comprise gas burners 21, 22 facing against each other with a prescribed space which are provided in both sides.

The gas burner 21 is fixed to covers 23, 24 covering side face portion of the skewer holder carrying mechanism 2 so that a radiating face of the gas burner 21 is positioned in the outer side, while the gas burner 22 is fixed to covers 25, 26 covering the gas burner 22 itself so that a radiating face thereof is positioned in the inner side.

In this embodiment, the gas burners 21, 22 are far-infrared ray gas burners, but the present invention is not limited to this configuration, and electric heaters may be used.

Gas inlet holes of the gas burners 21, 22 are communicated to a manifold 28 provided in front of a front face portion 11b of the base 11 via piping 27, 27, . . . . Provided on the manifold 28 are a cock 29 for inletting a gas, and cocks 30, 30 for adjusting a fire power.

The sauce storage tank 5 is provided on the base 11 at the rear edge portion, and can easily be mounted on or dismounted from the base 11.

The control unit 6 is provided in the base 11, and controls a driving motor 10 to actuate and stop the skewer holder carrying mechanism 2 and to control a carrying speed.

An operation panel 31 is provided on the front face portion 11b of the base 11, and an operation dial 32 and an operation lamp 33 are provided on the operation panel 31.

Figure 8A:
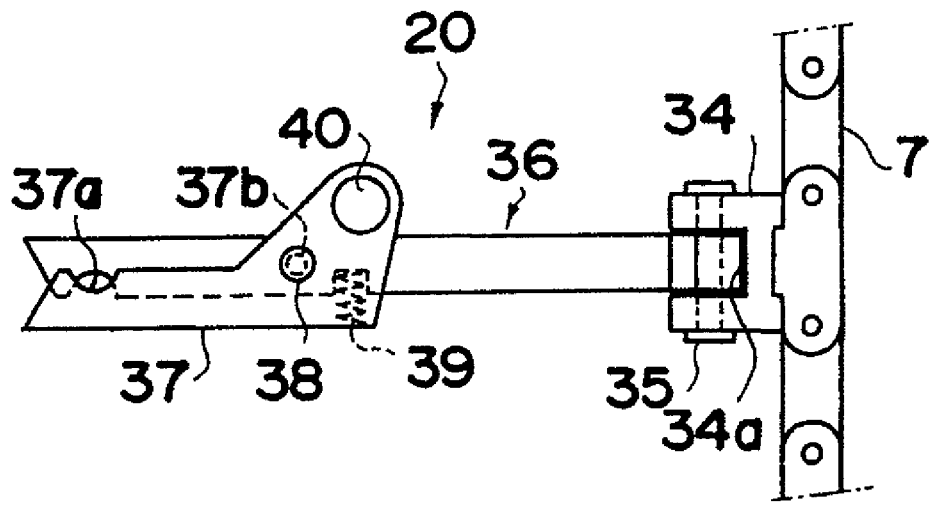
FIG. 8A is a plan view illustrating a state where a skewer holder is mounted on a support member and FIG. 8B is a side view illustrating the state.
Figure 8B:
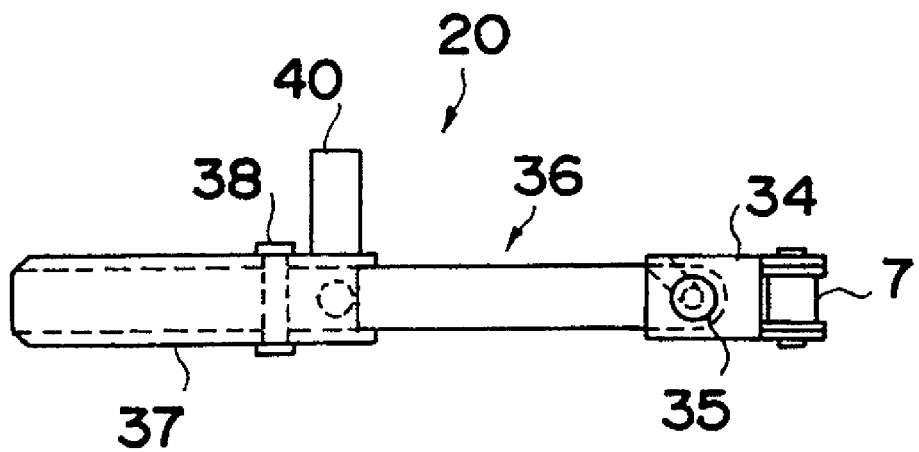
Figure 9A:
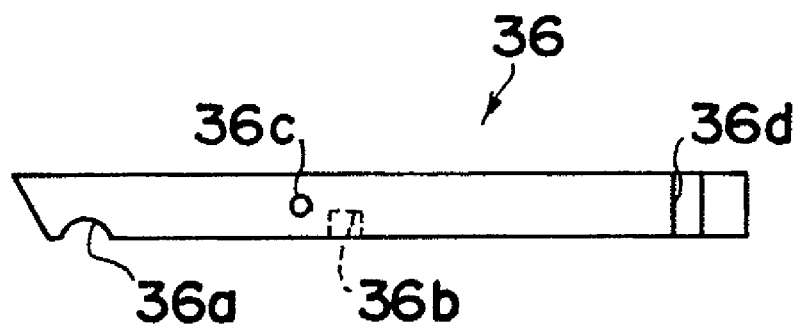
FIG. 9A is a plan view illustrating a holder main body of a skewer holder and FIG. 9B is a side view illustrating the holder main body.

As shown in FIG. 8 and FIG. 9, a plurality of support members 34, 34, . . . are fixed with a prescribed space therebetween on the endless rotary chain 7, and the skewer holders 20 are supported by the support members 34 via supporting pins 35 respectively so that the skewer holders 20 can freely rotate in the vertical direction.

The skewer holder 20 comprises a holder main body 36 and a movable clamping body 37 as shown in FIG. 8 and FIG. 9, and the movable clamping body 37 is linked to the holder main body 36 with a pivotal pin 38 so that the movable clamping body 37 can freely rotate in the horizontal direction.

In the ordinary mode, the movable clamping body 37 is elastically energized by a spring 39 to clamp and hold a skewer A.

The holder main body 36 is a metallic rectangular and lever-shaped body as shown in FIG. 8 and FIG. 9, and a groove 36a for clamping a skewer having a semicircular form is provided on a side face at a tip portion thereof, while a recessed portion 36b for setting a spring therein is provided on a side face at the intermediate portion. In addition, a pin insertion hole 36c is provided at the intermediate portion, and a pin insertion groove 36d inclined at a prescribed angle and extending from the top face to the central portion is provided at the base edge portion.

Figure 9B:
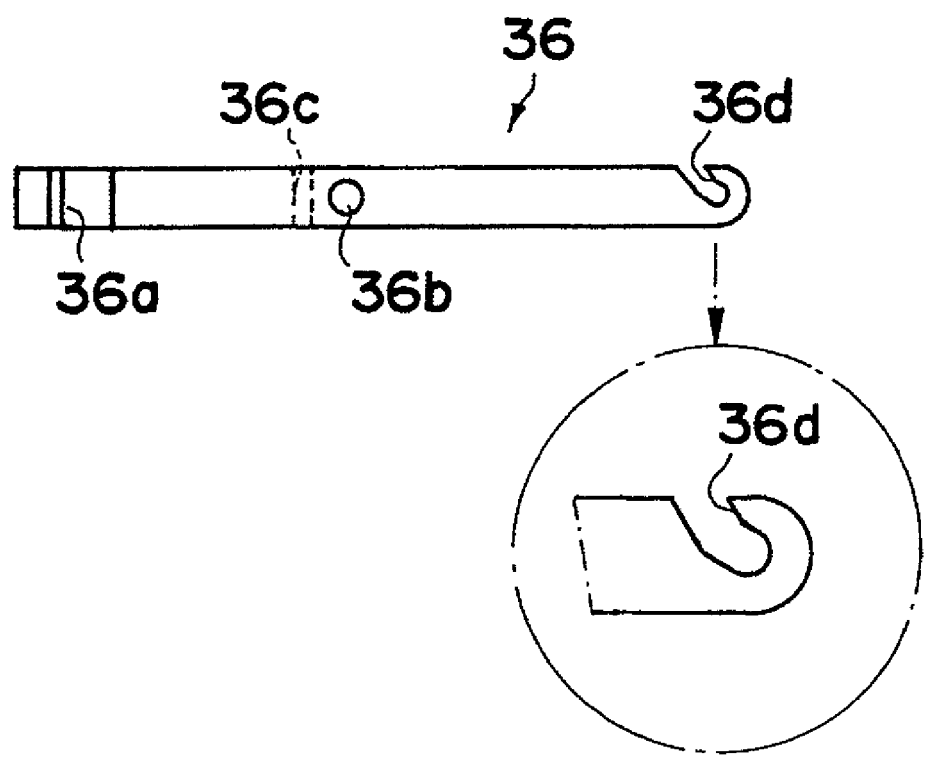

The supporting pin 35 inserted into the pin insertion groove 36d is not easily disengaged from the pin insertion groove 36 because movement of a rear edge face of the holder main body 36 in the horizontal direction is restricted by an internal face 34a of the mounting section of the supporting member 34, but for making the disengagement further difficult, it is preferable to inflect the pin insertion groove 36d as shown in FIG. 9B.

The movable clamping member 37 is prepared by bending the metal plate into a horse-shoe shape and has a top surface portion, a side surface portion, and a bottom surface portion as shown in FIG. 8. A skewer clamping groove 37a having a semicircular form is provided at a tip side portion of each of the top surface portion and the bottom surface potion, while a pin insertion hole 37b is provided at the intermediate portion. A release pin 40 is fixed to a base portion of the top surface potion in the upright state.

Figure 10A:
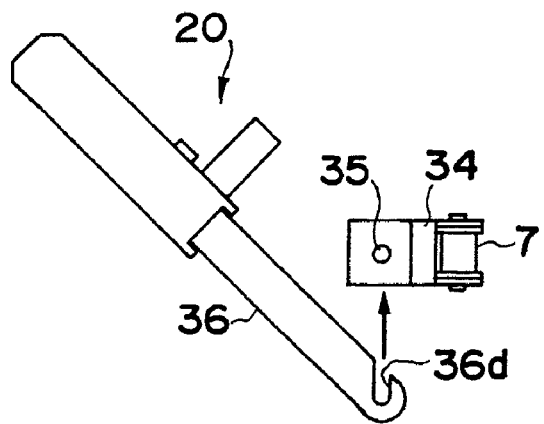
FIG. 10 is a view illustrating a method of mounting a skewer holder on a support member.
Figure 10B:
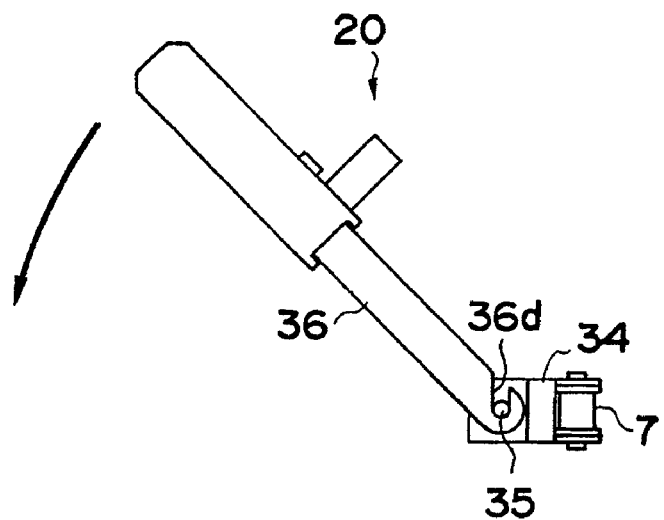
Figure 10C:
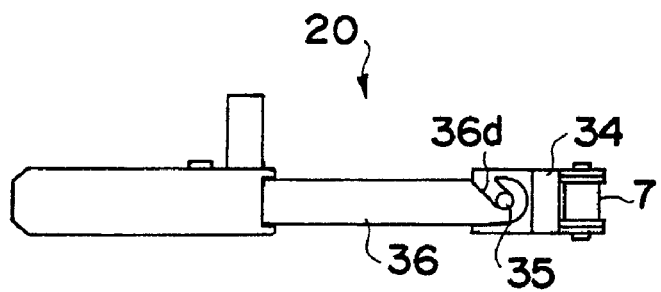

The skewer holder 20 has the configuration as described above, and therefore by inclining the skewer holder 20 at a prescribed angle with the tip portion oriented upward and moving the skewer holder 20 in the upward direction as shown in FIG. 10A, the supporting pin 35 of the supporting member 34 can be inserted being guided through the pin insertion groove 36d of the holder main body 36 as shown in FIG. 10B. Then by turning the skewer holder 20 in the downward direction, the skewer holder 20 can be supported by the supporting member 34 in the substantially horizontal direction as shown in FIG. 10C.

Therefore, the skewer holder 20 can be supported by the supporting member 34 without the need of dismounting the supporting pin 35 each time the skewer holder 20 is to be supported by the supporting member 34.

Provided in the skewer holder carrying mechanism 2 is a rail-formed skewer holder guide member 41 extending outward along the endless rotary chain 7 as shown in FIG. 1, and the holder main body 36 is placed on an upper edge face of the skewer holder guide member 41, so that the skewer holder 20 is carried in the substantially horizontal state in the normal operation.

A skewer releasing mechanism 42 is provided in the front left side portion of the skewer holder carrying mechanism 2, and the skewer releasing mechanism 42 comprises a supporting plate 43 fixed to a ceiling plate 14, and a press roller 45 rotatably supported by the supporting plate 43 via a spindle 44 as shown in FIG. 1.

Figure 11A:
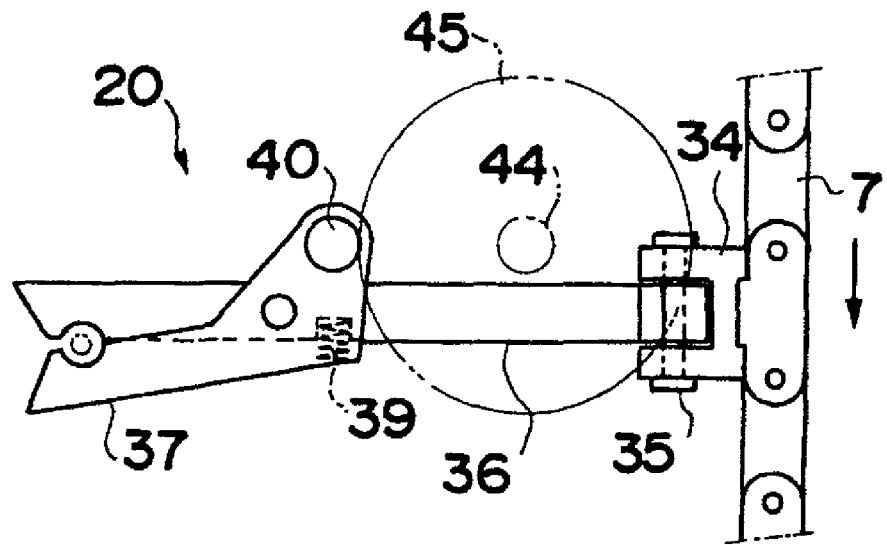
FIG. 11A is a plan view illustrating an action of a skewer releasing mechanism and FIG. 11B is a side view illustrating the action.
Figure 11B:
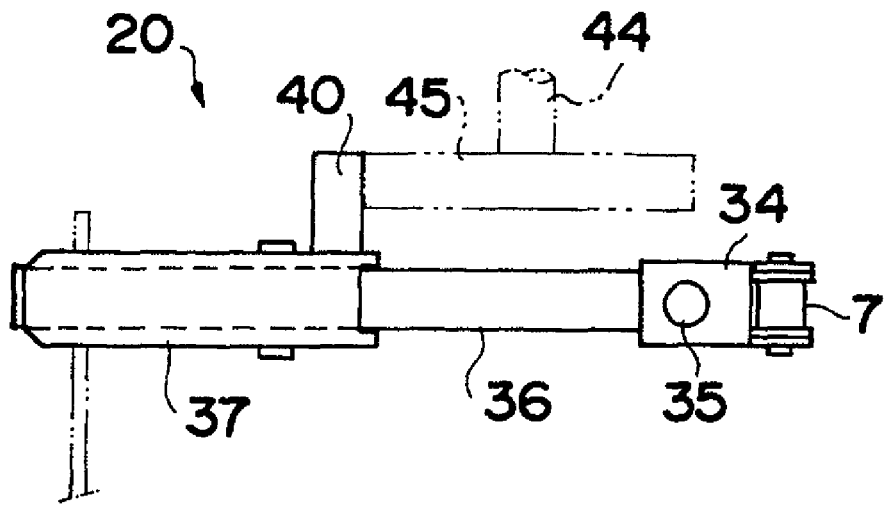

When the skewer holder 20 having a heated product of skewered roasted food product D thereon moves to the press roller 45 and the press roller 45 presses the releasing pin 40 fixed on the movable clamping body 37 as shown in FIG. 11, the press roller 45 rotates the movable clamping body 37 against a elastic force of a spring 39 to release the clamping state by the holder main body 36 and by the movable clamping body 37, so that the product of skewered roasted food is released and drops downward.

Then the product of skewered roasted food D dropped from the skewer holder 20 slides along a shoot 46 formed in the front left portion of the base 11, and is discharged from a product outlet port 47 formed on a front surface of the base 11, and is inserted onto a plate 48.

A skewer holder lifting member 49 with the upper edge face curbed and capable of changing the height is provided at a position adjacent to the sauce storage tank 5 at a rear edge portion of the skewer holder carrying mechanism 2 as shown in FIG. 1 and FIG. 5. A beginning edge and a end edge of the skewer holder lifting member 49 are connected to the skewer holder guide member 41, and in this configuration, when the skewer holder 20 reaches side face portions 5a, 5b of the sauce storage tank 5, a height of the upper edge face is set at the uppermost position, and when the skewer holder 20 reaches a central portion of the sauce storage tank 5, the height of the upper edge face is set at the lowermost position.

Figure 13A:
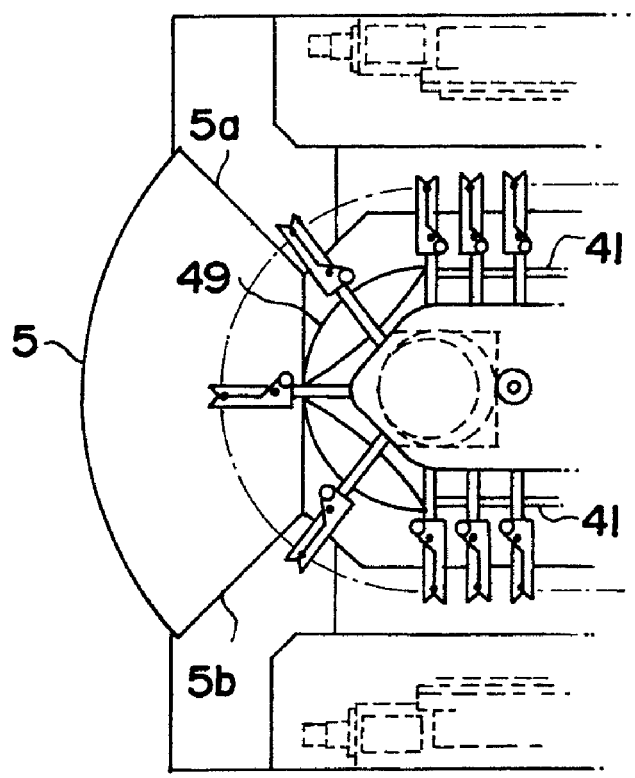
FIG. 13A is a plan view illustrating an operation of the skewer holder at a position adjacent to a sauce storage tank when a skewer holder support member is located at a lower position and FIG. 13B is a side cross-sectional view illustrating the operation.
Figure 13B:
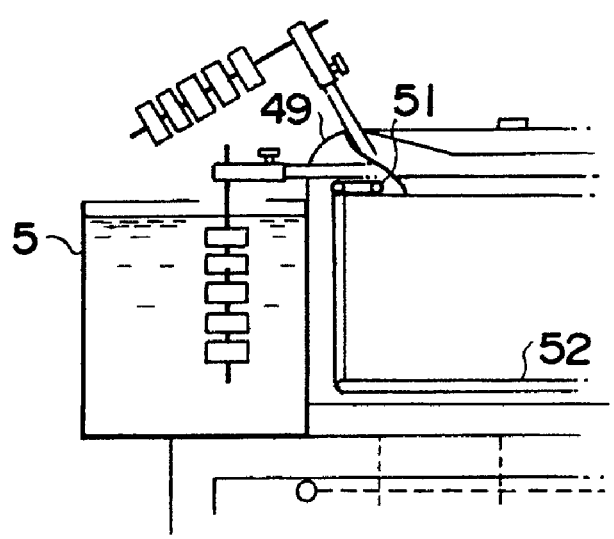

Therefore, as shown in FIG. 13, the skewer holder 20 placed on the skewer holder guide member 41 and carried in the horizontal posture is transferred to and placed on the skewer holder lifting member 49. Then the skewer holder 20 is placed on the skewer holder lifting member 49 and is turned upward. When the skewer holder 20 reaches the side face portion 5a of the sauce storage tank 5, the skewer holder 20 is inclined most, and when the skewer holder 20 reaches a central portion of the sauce storage tank 5, the skewer holder 20 returns to the substantially horizontal posture. Furthermore, when the skewer holder 20 reaches the side face portion 5b of the sauce storage tank 5, the skewer holder 20 is again inclined most.

Figure 12A:
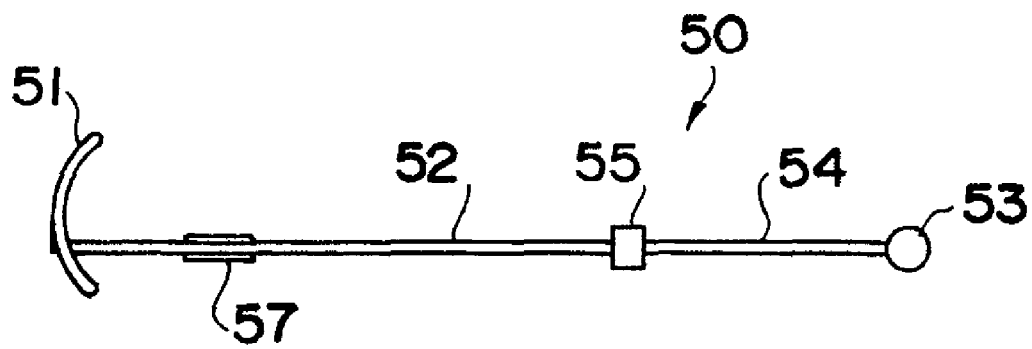
FIG. 12A is a plan view illustrating a sauce adhesion preventing mechanism and FIG. 12B is a side view illustrating the sauce adhesion preventing mechanism.
Figure 12B:
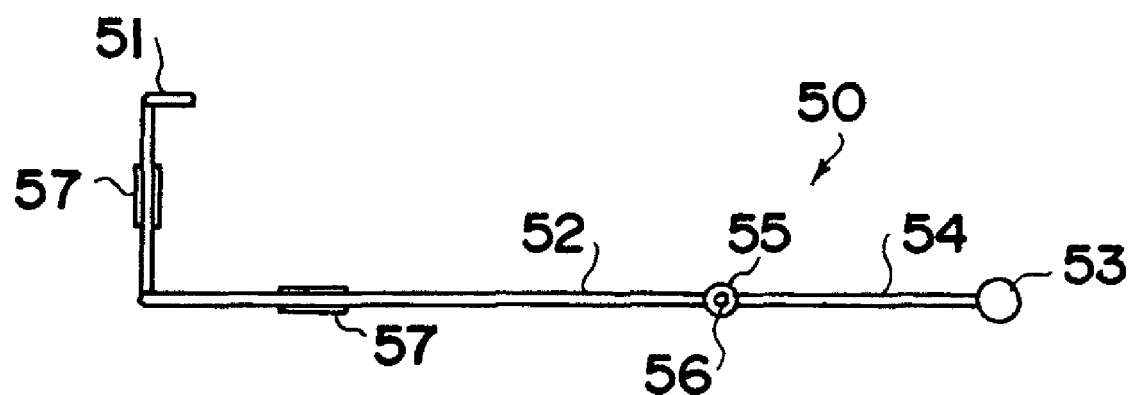

As shown in FIG. 12, the apparatus for roasting skewered food 1 has a sauce adhesion preventing mechanism 50. The sauce adhesion preventing mechanism 50 comprises a skewer holder holding member 51 having a circular form, a holding member support lever 52 like a curved lever, a grasping member 53, a grasping member support lever 54 like a straight lever, and a linking member 55 for linkage between the holding member support lever 52 and the grasping member support lever 54. The linking member 55 can freely rotate in the vertical direction with a spindle 56.

The holding member support lever 52 is divided to a vertical lever portion 52a, a curved lever portion 52b, and a horizontal lever portion 52c according to the necessity, and male screw portions are formed at the divided portion, and by screwing length adjusting members 57, 57 each with a female screw portion formed thereof, the lengths in the vertical direction and the horizontal direction can be adjusted.

The skewer holder holding member 51 is located at a position lower than an upper edge face of the skewer holder lifting member 49 during the normal operation as shown in FIG. 2 and FIG. 5, and the holding member support lever 52 is provided under the covers 23, 24 for the skewer holder carrying mechanism 2 and extends from a rear side to a front side of the base 11.

The grasping member support lever 54 protrudes from a support lever guide hole 58a provided on a cover 58 covering a front portion of the skewer holder carrying mechanism 2.

Because of the configuration described above, when the grasping member 53 and the grasping member support lever 54 are located at an upper position of the support lever guide hole 58a during the normal operation as shown in FIG. 4, because the skewer holder holding member 51 is located at a position lower than the upper edge face of the skewer holder lifting member 49 as shown in FIG. 13, the skewer holder 20 is placed on the skewer holder lifting member 49 as described above and moves upward or downward.

Figure 14A:
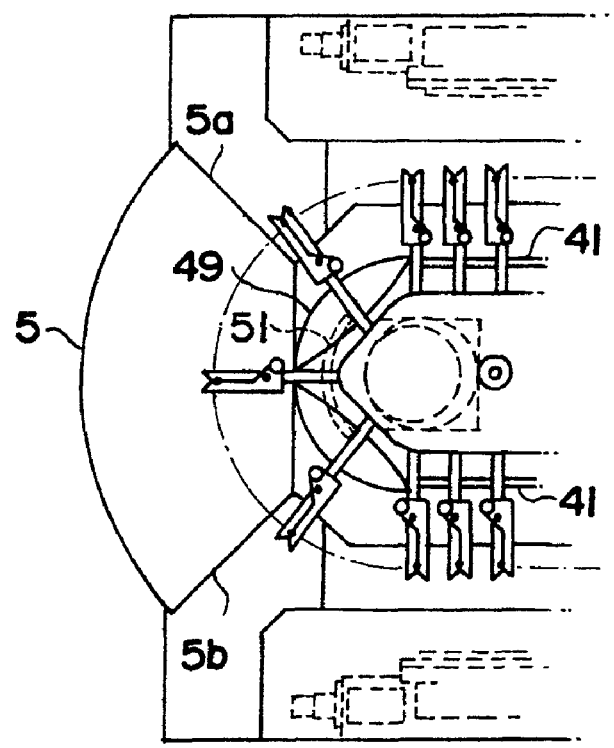
FIG. 14A is a plan view illustrating an operation of the skewer holder at a position adjacent to a sauce storage tank when a skewer holder support member is located at an upper position and FIG. 14B is a side cross-sectional view illustrating the operation.
Figure 14B:
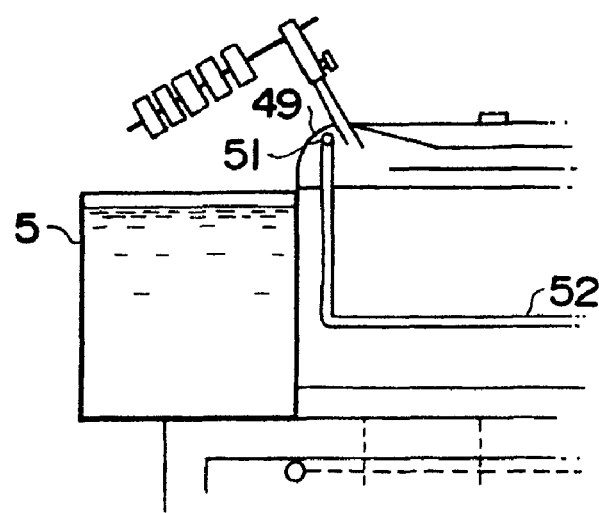

When an operator grasps and presses the grasping member 53 and positions the grasping member 53 and the grasping member support lever 54 at a lower position of the support lever guide hole 58a, the holding member support lever 52 rotates upwards and the skewer holder holding member 51 is located at the substantially same position of the upper edge face of the skewer holder lifting member 49 as shown in FIG. 14.

Therefore, the skewer holder 20 is placed on the skewer holder lifting member 49 and rotates upward and is set in the maximum inclined position. Then the skewer holder 20 is placed on the skewer holder holding member 51 and preserved at the maximum inclined state. Then, again the skewer holder 20 is placed on the skewer holder lifting member 49 and rotates downward, and is placed on the skewer holder guide member 41 to return to the horizontal posture.

Because of the configuration, when the grasping member 53 and the grasping member support lever 54 are positioned at the upper position of the support lever guide hole 58a during the normal operation, a raw material of skewered food can be immersed in sauce in the sauce storage tank 5 by moving up and down the skewer holder 20, and on the other hand, when the grasping member 53 is pressed down and the grasping member 53 and the grasping member support lever 54 are positioned at the lower position of the support lever guide hole 58a, the skewer holder 20 can be held at an upper position for preventing the raw material of skewered food C from being immersed in the sauce.

The apparatus for roasting skewered food 1 according to the present invention has the configuration as described above, and is used as described below for roasting skewered food.

An operator stands in front of the base 11, and rotates an operation dial 32 clockwise to turn on power for the apparatus for roasting skewered food 1. With this operation, the operation lamp 33 is lit, and operations of the apparatus for roasting skewered food 1 are actuated. Then the driving motor 10 drives and the endless rotary chain 7 moves.

In front of the base 11, the operator pushes a base edge portion of a skewer A of a raw material of skewered food C, which is prepared by setting food materials B on a skewer A, into skewer clamping grooves 36a, 37a of a holder main body 36 and a movable clamping body 37, so that the skewer A is clamped by the holder main body 36 and by the movable clamping body 37 and the raw material of skewered food C is hung down from and supported by the skewer holder 20.

The raw material of skewered food C held by the skewer holder 20 in the hung state reaches the position at which the heating device 3 is provided as shown in FIG. 1 and FIG. 4, and is heated by the gas burners 21, 22 while being carried by the endless rotary chain 7.

As shown in FIG. 1 and FIG. 13, when the skewer holder 20 is guided by the skewer holder lifting member 49 and rotates upward, the raw material of skewered food C getting closer to the sauce storage tank 5 rotates upward and is inclined, and when the raw material of skewered food C reaches the side face portion 5a of the sauce storage tank 5, the raw material of skewered food C is inclined at the maximum and moves over the side face portion 5a.

Then, when the skewer holder 20 rotates downward, also the raw material of skewered food C rotates downward, and the raw material of skewered food C is immersed in sauce stored in the sauce storage tank 5.

Furthermore, when the skewer holder 20 is guided by the skewer holder lifting member 49 and again rotates upward, also the raw material of skewered food C rotates upward and is inclined, and when the raw material of skewered food C reaches the side face portion 5b of the sauce storage tank 5, the raw material of skewered food C is inclined at maximum and moves over the side face portion 5b.

As shown in FIG. 1 and FIG. 4, the raw material of skewered food C immersed in sauce in the hung state again reaches the position where the heating device 4 is provided, and is heated by the gas burners 21, 22 while being carried by the endless rotary chain 7.

A product of skewered roasted food D completely heated reaches a position at which the skewer releasing mechanism 42 is provided, and when the press roller 45 presses the releasing pin 40 fixed to the movable clamping body 37 of the skewer holder 20, the movable clamping body 37 rotates to release the skewer A from the clamped state, so that the product of skewered roasted food D drops from the skewer holder 20.

The dropped product of skewered roasted food D slides on and along the shoot 46, and is discharged from the product outlet port 47 and is placed on the plate 48. As described above, the product of skewered roasted food D can almost automatically be cooked excluding the work for setting the raw material of skewered food C on the skewer holder 20.

When a skewered roasted food not immersed in sauce and roasted with salt is to be cooked, an operator is required only to press down the grasping member 53 to locate the grasping member 53 and the grasping member support lever 54 at the upper position of the support lever guide hole 58a.

With the operation described above, the skewer holder holding member 51 moves upward and is located at the substantially same position as the upper edge face of the skewer holder lifting member 49 as shown in FIG. 14. In this state, the skewer holder 20 is placed on and guided by the skewer holder lifting member 49 and the skewer holder holding member 51 at a position adjacent to the sauce storage tank 5, and preserved the utmost inclined state, so that the raw material of skewered food C is prevented from being immersed in the sauce.

As described above, with the apparatus for roasting skewered food 1 according to the present invention, an operator is required only to grasp a base edge portion of a skewer A with fingers in the state where a raw material of skewered food C is hung down, and to insert the base edge portion of the skewer A into a tip portion between the holder main body 36 and the movable clamping body 37 while a skewer holder 20 is passing through the front portion of the base 11. Therefore, the raw material of skewered food C can easily be held by the skewer holder 20 without touching the food materials B with fingers, which is preferable from the sanitary point of view.

There is provided the step of immersing the raw material of skewered food C in sauce while the raw material of skewered food C is carried by the endless rotary chain 7 along the heating devices 3, 4 and is heated, so that the product of skewered roasted food D can be cooked quickly within a short period of time.

Because the pin insertion groove 36d inclining at a prescribed angle is provided on the holder main body 36, so that an operator can set the skewer holder 20 on the supporting member 34, namely on the endless rotary chain 7, only by moving the skewer holder 20 upward in the inclined state and rotating the skewer holder 20 downward.

Therefore, when the number of skewer holders 20 to be set is changed or any skewer holder 20 is exchanged with a new one because of a failure or the like, it is not necessary to remove the endless rotary chain 7 from the sprockets 8, 9, so that the work for dismounting the skewer holder 20 is quite easy and can be performed quickly.

Furthermore, the driving sprocket 8 can be dismounted from the driving shaft 15 and the driven sprocket 9 can be dismounted from the driven shaft 18 without requiring any specific tool, so that the works for removing the endless rotary chain 7 and dismounting and exchanging a number of skewer holders 20 with new ones can easily be performed.

What is claimed is:

1. An apparatus for roasting skewered food comprising:
 a skewer holder carrying mechanism that carries a number of raw materials of skewered food prepared by setting food materials on a skewer in the vertical posture with a skewer holder mounted on an endless rotary chain;
 heating devices that heat the raw materials of skewered food from the both sides while the raw materials of skewered food are being carried;
 a sauce storage tank that immerses the raw materials of skewered food in sauce; and
 a control unit that actuates, stops, and controls a carrying speed of the skewer holder carrying mechanism.

2. The apparatus for roasting skewered food according to claim 1, further comprising:
 a skewer releasing mechanism that is pressed to a release pin fixed on a movable clamping body of a skewer holder to rotate the movable clamping body against an elastic force of a spring and release clamping by a holder main body of the skewer holder and the movable clamping body, said skewer releasing mechanism provided at an edge portion of the skewer holder carrying mechanism.

3. The apparatus for roasting skewered food according to claim 1, wherein the holder main body of the skewer holder has a support pin guide groove formed thereon, and the skewer holder can be set on the endless rotary chain via a support member by inserting the support pin in the support pin guide groove.

4. The apparatus for roasting skewered food according to claim 1, wherein a skewer holder lifting member for guiding the skewer holder placed thereon with a height of an upper edge surface changeable is provided at a position adjacent to the sauce storage tank.

5. The apparatus for roasting skewered food according to claim 4 further comprising:
 a sauce adhesion preventing mechanism comprising a skewer holder holding member for guiding the skewer holder placed thereon, a holding member support lever having a curved form, a grasping member, a grasping member support lever having a straight form, and a linking member for linkage between the holding member support lever and the grasping member support lever, wherein, when the grasping member support lever is moved, the skewer holder holding member moves upward and is positioned at the substantially same level as that of an upper edge surface of the skewer holder lifting member.

6. The apparatus for roasting skewered food according claim 2, wherein a skewer holder lifting member for guiding the skewer holder placed thereon with a height of an upper edge surface changeable is provided at a position adjacent to the sauce storage tank.

7. The apparatus for roasting skewered food according to claim 6 further comprising:
 a sauce adhesion preventing mechanism comprising a skewer holder holding member for guiding the skewer holder placed thereon, a holding member support lever having a curved form, a grasping member, a grasping member support lever having a straight form, and a linking member for linkage between the holding member support lever and the grasping member support lever, wherein, when the grasping member support lever is moved, the skewer holder holding member moves upward and is positioned at the substantially same level as that of an upper edge surface of the skewer holder lifting member.

8. The apparatus for roasting skewered food according claim 3, wherein a skewer holder lifting member for guiding the skewer holder placed thereon with a height of an upper edge surface changeable is provided at a position adjacent to the sauce storage tank.

9. The apparatus for roasting skewered food according to claim 8 further comprising:
 a sauce adhesion preventing mechanism comprising a skewer holder holding member for guiding the skewer holder placed thereon, a holding member support lever having a curved form, a grasping member, a grasping member support lever having a straight form, and a linking member for linkage between the holding member support lever and the grasping member support lever, wherein, when the grasping member support lever is moved, the skewer holder holding member moves upward and is positioned at the substantially same level as that of an upper edge surface of the skewer holder lifting member.

* * * * *